(12) United States Patent
Hughes et al.

(10) Patent No.: US 7,378,462 B1
(45) Date of Patent: May 27, 2008

(54) EXTRUDABLE COMPOSITIONS AND PROCESSES FOR PRODUCING SAME

(75) Inventors: Roderick E. Hughes, Newport Beach, CA (US); Thomas B. Hughes, Rancho Santa Marguerita, CA (US)

(73) Assignee: Hughes Processing, Inc, Costa Mesa, CA (US)

( * ) Notice: Subject to any disclaimer, the term of this patent is extended or adjusted under 35 U.S.C. 154(b) by 325 days.

(21) Appl. No.: 11/001,352

(22) Filed: Dec. 1, 2004

(51) Int. Cl.
*B29C 47/00* (2006.01)
(52) U.S. Cl. ......................... 524/13; 524/521
(58) Field of Classification Search ................... 524/13
See application file for complete search history.

(56) References Cited

U.S. PATENT DOCUMENTS

| | | | |
|---|---|---|---|
| 3,808,180 A | 4/1974 | Owens | |
| 3,994,631 A | 11/1976 | Hostetter | |
| 4,151,226 A | 4/1979 | Morinaga et al. | |
| 4,517,339 A | 5/1985 | Aliberto et al. | |
| 4,537,933 A | 8/1985 | Walker et al. | |
| 4,731,414 A | 3/1988 | Ting | |
| 4,831,079 A | 5/1989 | Ting | |
| 5,075,057 A | 12/1991 | Hoedl | |
| 5,883,191 A | 3/1999 | Hughes | |
| 6,004,668 A * | 12/1999 | Deaner et al. | 428/326 |
| 6,133,349 A | 10/2000 | Hughes | |
| 6,451,882 B1 | 9/2002 | Hughes | |
| 6,682,789 B2 | 1/2004 | Godavarti et al. | |
| 6,784,230 B1 | 8/2004 | Patterson et al. | |

* cited by examiner

*Primary Examiner*—Peter D. Mulcahy
(74) *Attorney, Agent, or Firm*—Stout, Uxa, Buyan & Mullins, LLP; Frank J. Uxa

(57) ABSTRACT

Materials which have substantial weatherability and impact resistance include a substantially uniform blend of an acrylonitrile/styrene/acrylic (ASA) polymeric material, a wood component in an amount effective as a filler, and a vinyl chloride polymeric material. Methods for making such compositions include combining a first population of pellets comprising an ASA polymeric material and a wood component, and a second population of different pellets comprising a vinyl chloride polymeric material.

21 Claims, No Drawings

EXTRUDABLE COMPOSITIONS AND PROCESSES FOR PRODUCING SAME

BACKGROUND OF THE INVENTION

The present invention relates to extrudable compositions comprising acrylonitrile/styrene/acrylic ("ASA") polymeric materials, wood, and vinyl chloride polymers, and to processes for making such compositions. More particularly, the present invention relates to compositions comprising pellets of ASA polymeric materials and wood which include physical mixtures of ASA polymers and wood, and pellets of one or more vinyl chloride polymers, which can be combined and extruded to form weatherable products or materials.

ASA polymeric materials are known and have been used in various applications which have taken advantage of the weatherability of such materials. As used herein, the term "weatherability" refers to the ability or property of a material to effectively withstand the conditions of an out-of-doors environment over a long period of time, for example, at least five years and preferably at least seven years, with substantially no degradation or decomposition.

ASA polymeric materials that have been taught include, for example, those disclosed in Yu in U.S. Pat. No. 3,994,631, which provides a multi-stage interpenetrating interpolymer. These ASA polymeric materials provide for excellent weatherability. Additionally, Ting U.S. Pat. Nos. 4,731,414 and 4,831,079 and Aliberto et al. U.S. Pat. No. 4,517,339 disclose that other additives may be blended with ASA interpolymers to achieve better optical quality, impact resistance, and fire retardancy. Other patents, for example, Walker et al U.S. Pat. No. 4,537,933 and Morinaga et al, U.S. Pat. No. 4,151,226 disclose ASA polymeric materials including terpolymers. Hughes U.S. Pat. No. 5,883,191 discloses ASA polymeric materials which are physical mixtures of acrylonitrile/styrene copolymers and acrylate copolymers.

Although wood is commonly used as a material of construction because of its strength, look and texture, it has the substantial disadvantage of being not very weatherable.

It would be advantageous to provide compositions which are extrudable into materials or products having one or more of the aforementioned weatherability properties and benefits, such as a wood-like look and texture from the presence of wood for many applications.

SUMMARY OF THE INVENTION

New methods for making weatherable materials or products from compositions, such as extrudable compositions, comprising an acrylonitrile/styrene/acrylic polymeric material and a wood component, and a vinyl chloride polymeric material have been discovered. The present invention is based on the discovery that weatherable materials or products with desired properties can be accurately and/or controllably and/or reproducibly produced using compositions comprising first pellets comprising acrylonitrile/styrene/acrylic (ASA) polymeric materials and wood, and second pellets comprising one or more vinyl chloride polymers, the second pellets preferably being substantially free of wood.

One advantage of the present invention is that compositions comprising such first and second pellets can be fabricated into materials or products which have a wood-like look and texture, derived at least in part from the wood component included in the first pellets. Moreover, the resulting materials or products advantageously have desirable properties, for example, weatherability, strength, flexibility and the like.

As used herein, "pellets" refer to relatively small elements, including composite elements, that may comprise smaller sized pieces or particles of one or more substances. As used herein, pellets typically have a size greater than a particle. Pellets can have any desired shape including, without limitation, cylindrical, spherical, tablet, and other geometric shapes.

In a broad aspect of the present invention, a process for producing an extrudable composition useful in forming weatherable materials or products comprises combining a first population of pellets that comprise an ASA polymeric material and a wood component, and a second population of different pellets that comprise a vinyl chloride polymeric material to form a combination of pellets which is extrudable into a weatherable material or product. The wood component is advantageously provided in an amount effective as a filler in the weatherable materials. The population of pellets can be as little as one pellet to more than one pellet, and may include more than about 100 or even more than about 1000 pellets.

By providing two or more populations of different pellets, it is possible to provide enhancements in weatherable materials or products. For example, using two or more populations of different pellets, it is possible to provide more control over the relative amounts of the various polymeric materials or other components in the weatherable material to address a particular need. Thus, customized weatherable materials can be produced using the populations of pellets herein that provide advantages over existing processes and compositions.

In one embodiment of the present invention, compositions are provided which comprise a first population of pellets that comprise an ASA polymeric material and a wood component, and a second population of different pellets that comprise a vinyl chloride polymer. The second population of pellets is combinable, that is the second population of pellets can be combined, with the first population of pellets to form an extrudable composition.

In one very useful embodiment, the pellets of the first population may be a substantially uniform blend of an uncrossed-linked acrylonitrile/styrene copolymer, for example, a linear uncross-linked acrylonitrile/styrene copolymer, an acrylate copolymer, such as a cross-linked alkyl acrylate/graft (meth)acrylate copolymer, and wood, for example, wood component particles. Wood is used because it may be effectively used to provide an aesthetically pleasing wood-like look and/or texture to the outer surface of the final product, e.g., housing siding, structural members and the like, including the present weatherable materials.

The pellets of the first population can include ASA derived from terpolymers, interpolymers, and the like and mixtures thereof.

Any and all features described herein and combinations of such features are included within the scope of the present invention provided that the features of any such combination are not mutually inconsistent. In addition, any feature or combination of features may be specifically excluded from any embodiment of the present invention.

These and other aspects of the present invention are apparent in the following detailed description of the invention.

DETAILED DESCRIPTION

New methods or processes for manufacturing weatherable materials have been invented. Generally, the methods comprise combining two or more different types of pellets suitable to form weatherable materials. The pellets can be combined to enhance properties of the weatherable materials and provide customized proportions of pellet components depending on the intended use of the weatherable materials. Each type of pellet may be understood to be a single population of pellets. The different types of pellets may be combined to form a combination of types or populations of pellets, or in other words, a composition comprising two or more different populations of pellets.

In one embodiment of the present invention, a process for producing an extrudable composition useful in forming weatherable materials comprises combining a first population of pellets and a second population of different pellets to form a combination of pellets that is extrudable into a weatherable material. In other words, the combination of pellets comprises two or more types of different pellets. In one embodiment, the first population of pellets comprises an acrylonitrile/styrene/acrylic (ASA) polymeric material and a wood component, and the second population of pellets comprises a vinyl chloride polymeric material. As discussed herein, each population of pellets can comprise one or more pellets. The pellets of each population may have similar characteristics or features, such as sizes, shapes, and the like. In addition, the pellets of one population may have the same or different characteristics compared to pellets of another population.

In one embodiment, the process may comprise a step of providing a first population of pellets of an ASA polymeric material and a wood component, a step of providing a second population of pellets of a vinyl chloride polymeric material; and a step of combining the first population of pellets with the second population of pellets to form a combination of pellets. As discussed herein, the combination of pellets can be extruded to form a weatherable material. Thus, the method may also comprise a step of extruding the combination of pellets.

The combination of pellets produced by the processes disclosed herein may be understood to be a composition. Thus, a composition of the present invention may comprise a first population of pellets that comprise an ASA polymeric material and a wood component, and a second population of different pellets comprising a vinyl chloride polymer. The second population of pellets and the first population of pellets can be combined to form the composition, which can be extruded to form a weatherable material.

In one embodiment of the present invention, the population of pellets which comprises a vinyl chloride polymer is substantially free of wood particles. In certain embodiments of this invention, the first population of pellets may consist essentially of ASA polymeric materials and wood. The second population of pellets may consist essentially of vinyl chloride polymeric material.

The present compositions may be provided in a container. For example, a container may comprise a population of pellets of an ASA polymeric material and a wood component. Another container may comprise a population of pellets of a vinyl chloride polymer. In addition, a container may comprise a pellet composition, such as a first population of pellets comprising an ASA polymeric material and a wood component, and a second population of pellets comprising a vinyl chloride polymer. Advantageously, the present compositions can be provided in predetermined amounts that may vary depending on a particular user's needs. For example, in one embodiment, the first population of pellets of an ASA polymeric material and a wood component may comprise from about 5% or about 10% or about 20% or about 30% or about 45% to about 55% or about 70% or about 80% or about 95% by weight of the composition, and the second population of pellets of a vinyl chloride polymer may comprise from about 5% or about 10% or about 20% or about 30% or about 45% to about 55% or about 70% or about 80% or about 95% by weight of the composition. The actual proportions of first and second pellets selected depend on the desired properties of the final material or product to be produced.

The containers which contain the present compositions can be any suitable article having a cavity that can hold one or more pellets, such as the extrudable pellets disclosed herein. Non-limiting examples of suitable containers include buckets, barrels, cans, bags, boxes, and the like. Such containers may be sealed or unsealed. In addition, as used herein, containers refer to articles that are structured to hold one or more pellets during the manufacture of weatherable materials. For example, a container may be a component of an extruder system, which component is structured to hold one population of pellets, or a combination of different types of pellets.

The present compositions can be used to form weatherable, impact resistant articles or materials. For example, the present compositions, alone or in combination, e.g., as a composite, laminate and the like, with one or more other materials can be used to produce articles, such as window coverings, house sidings, and other articles which are resistant to the effects of outdoor weather on a long term basis, and therefore, can be employed out-of-doors. The present compositions can be molded, extruded and/or otherwise formed into shapes and configurations useful in producing such finished product articles. Such finished product articles can include only the compositions of the present invention, including the present compositions in forms other than pellets, or can be composites or other combinations of the present compositions with other materials.

The present compositions may include one or more components of the compositions disclosed in Hughes U.S. Pat. No. 6,451,882.

In one embodiment, the present compositions comprise substantially uniform blends of uncross-linked acrylonitrile/styrene copolymers, acrylic copolymer (hereinafter cross-linked alkyl acrylate/graft (meth)acrylate copolymers) and a wood component. The composition, in one embodiment, includes at least about 30% by weight, based on the total weight of the above-noted copolymers of an uncross-linked acrylonitrile/styrene copolymer and at least about 5% by weight, based on the total weight of the above-noted copolymers, of the cross-linked alkyl acrylate/graft (meth)acrylate copolymer. The wood component is present in an amount effective as a filler in the final composition, or in an amount effective as a filler in the final weatherable material. The specific amount of wood component included is often similar or on the same order as the amount of such components used as fillers in conventional ASA or other polymeric materials. More preferably, the acrylonitrile/styrene copolymer is present in an amount in the range of about 30% to about 95% by weight, based on the total weight of the copolymers, and the cross-linked alkyl acrylate/graft (meth) acrylate copolymer is present in an amount in the range of about 5% to about 70% by weight, based on the total weight of the copolymers.

The uncross-linked acrylonitrile/styrene copolymers useful in the present compositions preferably have an acrylonitrile content in the range of about 20% to about 40% by weight, and a styrene content in the range of about 60% to about 80% by weight.

The uncross-linked acrylonitrile/styrene copolymer component can be produced by polymerization, e.g., emulsion or suspension polymerization, of a mixture of acrylonitrile and styrene. See, for example, Yu et al U.S. Pat. No. 3,944,631.

Emulsion polymerization is carried out by adding the acrylonitrile-styrene charge to an aqueous emulsion.

If desired, minor amounts, e.g., below about 20% by weight, of optional monomers can be included. Examples of such optional monomers are t-butyl styrene, p-chlorostyrene, alpha-methyl styrene, methyl methacrylate, alkyl acrylate, vinylidene chloride, ethylene, propylene, isobutylene and/or other ethylenically unsaturated compounds copolymerizable with acrylonitrile and styrene. Preferably, the only significant or substantial monomers used are acrylonitrile and styrene.

Emulsifiers, initiators and chain transfer agents can be used in effective amounts to provide the desired result or benefit during the acrylonitrile-styrene polymerization.

The emulsifier which may be used is at least one of the following conventional types: an anionic emulsifier, e.g., the $C_2$-$C_{22}$ carboxylic acids, the sulfates or, sulfonates, of $C_6$-$C_{22}$ alcohols or alkyl phenols; a non-ionic emulsifier, e.g., the addition products of alkylene oxides to fatty acids, amines or amides; a combination of the foregoing anionic and non-ionic emulsifiers; or the cationic emulsifiers, e.g., a quaternary ammonium containing compound. The amount of emulsifier preferably is present in an amount in a range of about 0.5% to about 5% by weight in the emulsion.

An initiator preferably is present in the emulsion in an amount in a range of about 0.005% to about 2% by weight of the monomer charge. Suitable for use are water-soluble peroxidic compounds, e.g., hydrogen peroxide and alkali metal and ammonium persulfates, oil soluble organic peroxides and azo compounds, e.g., benzoyl peroxide, azobisisobutyronitrile and the like, used singly or in combination. Redox catalysts, e.g., mixtures of peroxidic catalysts with reducing agents, such as hydazine, alkali metal bisulfites, thiosulfates, and hydrosulfites, and soluble oxidizable sulfoxyl compounds can also be used.

A chain transfer agent such as an alkyl mercaptan, e.g., t-dodecyl mercaptan, toluene, xylene, chloroform, halogenated hydrocarbons and the like may also be used.

A buffer to keep the pH at 7.0 or higher is preferably included in the emulsion.

If suspension polymerization is chosen, the suspending agent can be methyl cellulose, hydroxyethyl cellulose, hydroxypropyl cellulose, hydroxypropyl methyl cellulose, carboxymethyl cellulose, talc, clay, polyvinyl alcohol, gelatine and the like.

Other additives can be used in forming the linear acrylonitrile/styrene copolymers to confer desired properties upon the final product. Included are conventional light, thermal and ultraviolet light stabilizers, antioxidants, dyes, pigments, mineral additives and fillers and reinforcing agents, and the like.

Uncross-linked or linear acrylonitrile/styrene copolymers are commercially available. Such commercially available copolymers are useful in the present invention and, in fact, are preferred. Using such commercially available copolymers reduces the capital investment needed to commercially practice the invention. In addition, purchasing such acrylonitrile/styrene copolymers, which can be routinely analyzed using conventional techniques, eliminates the economic risk of making copolymers which do not have the desired properties. Examples of useful commercially available uncross-linked acrylonitrile/styrene copolymers include materials sold under the trademark Blendex 570 and Tyril 860 sold by GE Specialty Chemicals and Dow Chemical, respectively. A particularly useful commercially available uncross-linked, linear acrylonitrile/styrene copolymer is that sold by Bayer under the trademark Lustran, e.g., Lustran 31.

The cross-linked alkyl acrylate/graft (meth)acrylate copolymers included in the compositions of the present invention preferably are multistage elastomers comprised of a cross-linked alkyl acrylate which is graft linked to a poly (meth)acrylate, preferably polymethyl (meth)acrylate. The cross-linked alkyl acrylate/graft (meth)acrylate copolymer includes an alkyl acrylate portion present in a range of about 50% to about 95% by weight of the copolymer, and a (meth)acrylate portion present in a range of about 5% to about 50% by weight of the copolymer The cross-linked alkyl acrylate portion of the cross-linked alkyl acrylate/graft (meth)acrylate preferably is a copolymer containing a major proportion, that is at least 50% by weight, of alkyl and/or aralkyl acrylates, with the inclusion of about 0.05% to about 50% by weight of a polyunsaturated cross-linking comonomer and about 0% to about 10% by weight of a hydrophilic comonomer, ordinarily polymerized from an emulsion or suspension. The alkyl esters of acrylic acid have alkyl groups of 1 to about 15 carbon atoms, preferably 1 to about 8 carbon atoms. Longer chain alkyl groups may be used. Other acrylic monomers, up to about 50 weight percent, less the other inclusions, can also be used, such as aralkyl esters of acrylic acid wherein the cyclic portion contains 5, 6 or 7 carbon atoms with or without an additional alkyl bridge, and the alkyl portion of the aralkyl group containing up to about 15 carbon atoms may also be used. Substituted acrylates or methacrylates including alkylthioalkyl acrylates such as ethylthioethyl acrylate and the like, alkoxyalkyl acrylates, such as methoxyethyl acrylate and the like, can also be used. Interpolymers with these acrylates can be based on up to about 40% by weight of one or more other addition polymerizable monomers such as styrene, alpha-methyl styrene, vinyl ethers, amides, and esters, vinyl and vinylidene halides and the like.

The (meth)acrylate portion of the cross-linked alkyl acrylate/graft (meth)acrylate copolymers may be characterized as having the majority (e.g., 50% to 100%) of alkyl (meth) acrylate units. The alkyl (meth)acrylate polymers may contain minor amounts (0% to about 40%) of non-acrylic units to provide well-known balances of physical characteristics. These polymers preferably have a heat distortion temperature greater than about 68° F., more preferably greater than about 120° F. The (meth)acrylate portion may include copolymers of about 50% to 100% alkyl methacrylate, wherein the alkyl group contains 1 to 4, preferably 1, carbon atoms, and 0% to about 50% of one or more other acrylic monomers such as other alkyl and aryl methacrylates, alkyl and aryl acrylates, alkyl and aryl acrylamides, substituted alkyl and aryl methacrylates and acrylates such as halogen, alkoxy, alkylthio, cyanoalkyl, amino, alkylthiol esters and other substituents, and 0% to about 40% of other unsaturated monomers including vinyl esters, vinyl ethers, vinyl amides, vinyl ketones, vinyl halides, vinylidene halides, olefins and the like.

Among the hydrophilic monomers which may be included in the cross-linked alkyl acrylate/graft (meth)acrylate copolymers can be, by way of example only, hydroxysubstituted alkyl and aryl acrylates and methacrylates, amino-substituted alkyl and aryl acrylates and methacrylates, polyether acrylates and methacrylates, alkyl-phosphato-alkyl acrylates and methacrylates, alkyl-phosphonoalkyl acrylates and methacrylates, acrylic acid, methacrylic acid, maleic acid, maleic anhydride, N-vinyl pyrrolidone, alkyl and substituted alkyl amides of acrylic acid, and methacrylic acid, acrylamide, methacrylamide and the like.

Graft-linking monomers useful in producing the present cross-linked alkyl acrylate/graft (meth)acrylic copolymers, by way of example only, include allyl group containing compounds, such as allyl esters of ethylenically unsaturated acids. Most preferred are allyl acrylate, allyl methacrylate, diallyl maleate, diallyl fumarate, allyl acid itaconate and the like.

The cross-linked alkyl acrylate/graft (meth)acrylate copolymers preferably include cross-linked n-butyl acrylate-containing polymers and/or methyl methacrylate-containing polymers. In a particularly useful embodiment, the cross-linked alkyl acrylate/graft (meth)acrylate copolymer comprises a two stage polymer having a cross-linked n-butyl acrylate-based rubbery core and a second stage polymerized from methylmethacrylate alone or in combination with styrene.

Especially preferred cross-linked alkyl acrylate/graft (meth)acrylate copolymers include the core-shell polymers of the type available from Rohm & Haas Co. under the trademark Acryloid® KM330 and KM334. These components contain units derived from n-butyl acrylate, alone or in combination with a vinyl aromatic compound. Components of this type are disclosed in Owens U.S. Pat. No. 3,808,180.

In another aspect of the invention, the compositions comprise substantially uniform blends of interpolymer ASA and a wood component. The composition, in one embodiment, includes the interpolymer in a range of about 5 to 95% by weight of the composition mixture. More preferably, the composition includes the interpolymer in a range of about 25 to 40% by weight of the composition mixture. The wood component is present in an amount effective as a filler in the final composition. The specific amount of wood component included is often similar or on the same order as the amount of such components used as fillers in conventional ASA or other polymeric materials.

Interpolymer ASA of various types are available from several commercial sources. However, for a good balance of overall properties, including impact, tensile and flexural properties, it is particularly preferred that the selected ASA resin is an interpolymer (i.e. interpenetrating network) comprised of crosslinked (meth)acrylate, crosslinked styrene-acrylonitrile, and uncrosslinked styrene-acrylonitrile components. The term "interpolymer comprised of crosslinked (meth)acrylate, crosslinked styrene-acrylonitrile, and uncrosslinked styrene-acrylonitrile components" is meant to encompass the type of interpolymer composition described in Yu et al U.S. Pat. No. 3,944,631. The aforementioned alkyl acrylate, crosslinked styrene-acrylonitrile and uncrosslinked styrene-acrylonitrile polymers may be alternating copolymers, random copolymers, or block copolymers. Additionally, the alkyl acrylate polymer may also be a homopolymer. Furthermore, the crosslinked alkyl acrylate and crosslinked styrene-acrylonitrile may be of the following conformations: branched, network, star, comb, ladder or semiladder.

More preferably, the interpolymer is formed by a polymerization process. Commercially available interpolymers which are formed by polymerization include ASA/Blendex 984 (GE Specialty Chemicals), ASA/Centrex 811 (Bayer), ASA/Luran (BASF), and ASA/LI 911 (LG Chemical/Korea).

In one aspect of this invention, the interpolymer ASA is preferably formed by the polymerization process disclosed in Yu U.S. Pat. No. 3,944,631.

Briefly, the process comprises the steps of emulsion polymerizing at least one alkyl acrylate monomer in the presence of from about 0.05% to about 10% by weight of a polyfunctional crosslinking monomer to form an aqueous latex of crosslinked acrylic elastomer particles, thereafter emulsion polymerizing a charge of styrene and acrylonitrile monomers in the presence of a crosslinking agent and the crosslinked latex particles to crosslink the styreneacrylonitrile charge, and thereafter adding a monomeric charge of styrene and acrylonitrile which does not contain a crosslinking agent but which does contain an initiator to polymerize the monomers and form a linear styrene-acrylonitrile polymer. The final product that is formed has impact and weather resistance and comprises from about 10 to 50% by weight of the crosslinked acrylic elastomer, from about 5 to about 35% by weight of the crosslinked styrene-acrylonitrile copolymer surrounding and penetrating the crosslinked acrylic elastomer, and from about 15 to 85% by weight of the polymerized linear styrenacrylonitrile.

In greater detail, now, the elastomer particles are made by means of conventional aqueous emulsion procedures as well known to those skilled in the art of using emulsifiers and water soluble catalysts.

Thus, in conducting the aqueous emulsion polymerization step leading to the preparation of elastomer particles, there is preferably first prepared a monomer charge comprising an aqueous emulsion containing about 10 to 50%, by weight, of one or more monomers, the identity of which will be described hereinbelow, and from 0.2 to 2.0% by weight of a suitable emulsifier. From about 0.05 to 2.0% by weight of the monomer mixture, of a water-soluble catalyst, such as ammonium, sodium or potassium persulfate, hydrogen peroxide or a redox system, such as a mixture of a persulfate with an alkali metal bisulfate, thiosulfate or hydrosulfite, is introduced, and the mixture is then heated at a temperature of from about 40 to 95 degree C. for a period of about 0.5 to 8 hours.

The acrylic elastomer particles used in preparing the compositions of this invention comprise crosslinked acrylic polymers or copolymers having a Tg, i.e., a glass transition temperature, of less than about 25 degree C. which can be polymerized by means of free radical initiated emulsion techniques. These acrylic elastomer particles should be crosslinked so that they can retain their size and shape during subsequent polymer processing steps. This crosslinking can be achieved during the polymerization of the elastomer if a polyfunctional ethylenically unsaturated monomer is included in the polymerization recipe. As used in this disclosure, the term "crosslinked" denotes a polymer which at ambient temperatures is substantially insoluble in such organic solvents as tetrahydrofuran or cyclohexanone.

Examples of acrylic elastomer that can be used include the crosslinked polymer of the $C_2$-$C_{10}$ alkyl acrylate and the $C_8$-$C_{22}$ alkyl methacrylate monomers, preferably the $C_4$-$C_8$ alkyl acrylates, such as poly(n-butyl acrylate), poly(ethyl acrylate) and poly(2-ethylhexylacrylate). At least one acrylate monomer is utilized in this step. If desired, the monomer charge may contain small amounts, i.e., 1 to 20% by weight of the amount acrylate monomer, of optional monomers including styrene, acrylonitrile, methyl methacrylate, methacrylic acid, acrylic acid, vinylidene chloride, vinyl toluene and other ethylenically unsaturated monomer copolymerizable with the acrylate monomer selected for use.

In order to crosslink the acrylate monomer from about 0.05 to about 10% by weight (preferably 0.1 to 5%) based on the weight of acrylate monomer, of at least one crosslinking agent is used. The crosslinking agent is for the purpose of this invention a di- or polyfunctional ethylenically unsaturated monomer having at least one vinyl group of the formula:

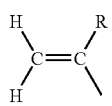

wherein R is hydrogen or lower alkyl. As is well known in the art the vinyl groups on the crosslinking monomer can be the same (e.g. dinyl benzene, trimethylol propane triacrylate, etc.) or different, (e.g., allyl methacrylate, diallyl fumarate, dially maleate, etc.) Examples of other suitable crosslinking monomers which are known to persons in the art and which can be used are 1,3-butylene dimethacrylate, diethylene glycol dimethacrylate, ethylene glycol dimethacrylate, trimethylolpropane, triethacrylate, methylene bisacrylamide, diethylene glycol diacrylate, divinyl ether, dially phthalate, divinyl sulfone, divinyl sorbitol, triethylene glycol dimethacrylate, trimethylene glycol diacrylate, butylene glycol diacrylate, pentamethylene glycol diacrylate, glyceryl triacrylate, octylene glycol diacrylate, trimethylolpropane triacrylate, the tetracrylate ester of pentaerythritol and various diallyl phosphonates.

Optimum results are obtained by the use of a crosslinked copolymer containing from about 95 to 99.9% by weight, of butylene glycol diacrylate.

The emulsifier which is used is at least one of the following conventional types: an anionic emulsifier, e.g., the $C_2$-$C_{22}$ carboxylic acids, the sulfates or, sulfonates, of $C_6$-$C_{22}$ alcohols or alkyl phenols: a non-ionic emulsifier, e.g., the addition products of alkylene oxides to fatty acids, amines or amides; a combination of the foregoing anionic and non-ionic emulsifiers; or the cationic emulsifiers, e.g., a quaternary ammonium containing compound. The amount of emulsifier should be present from about 0.5% to about 5% by weight in the emulsion.

Moreover, in a preferred embodiment of the process of this invention, it has been found that regardless of the particular emulsifier being utilized in preparing the rubber polymer latex, its polymerization in large scale commercial equipment is greatly facilitated by introducing the monomer charge to the system in several portions over a period of from 1 to 3 hours. Thus, where this is not done and the total monomer charge is introduced in one portion, the resulting exothermic polymerization reaction often becomes virtually uncontrollable leading to overheating which, in turn, may set up, i.e., coagulate, the resulting polymer latex. However, by dividing the monomer charge and introducing it in about several portions, the resulting polymerization reaction remains controllable and overheating and coagulation can be prevented.

An initiator is also present in the emulsion in an amount ranging from about 0.005 to 2% by weight of the acrylate monomer. Suitable for use are water-soluble peroxidic compounds, e.g., hydrogen peroxide and alkali metal and ammonium persulfates, oil soluble organic peroxides and azo compounds, e.g., benzoyl peroxide, azobisisobutyronitrile and the like, used singly or in combination. Redox catalysts, e.g. mixtures of peroxidic catalysts with reducing agents, such as hydrazine, alkali metal bisulfates, thiosulfates, and hydrosulfites, and soluble oxidizable sulfoxyl compounds can also be used.

A chain transfer agent such as alkyl mercaptan, e.g., t-dodecyl mercaptan, toluene, xylene, chloroform, halogenated hydrocarbons and the like may also be used.

A buffer to keep the pH at 7.0 or higher is a final component of the emulsion.

The next step in preparing the present polymers is the emulsion polymerization of a mixture of styrene and acrylonitrile in the presence of a minor portion of at least one di-functional or polyfunctional crosslinking monomer to form a crosslinked styrene-acrylonitrile polymer. This emulsion polymerization is carried out in the presence of the crosslinked acrylic elastomer by adding the styrene-acrylonitrile charge to the previously prepared aqueous emulsion of crosslinked acrylate elastomer. The amount of styrene-acrylonitrile which is added ranges from 5 to 35% of the weight of the final product that will be produced whereas the crosslinked acrylate elastomer is present from about 10 to 50% based upon the weight of the final product which will be formed.

The monomer charge of styrene-acrylonitrile can comprise from about 50/50 to 85/15 weight parts of styrene to acrylonitrile with the preferred ratio being 76/24. If desired, minor amounts, e.g., below about 20% by weight, of optional monomers can be included. Examples are t-butyl styrene, p-chlorostyrene, alpha-methylstyrene, methyl methacrylate, alkyl acrylate, vinylidine chloride, ethylene, propylene, isobutylene and other ethylenically unsaturated compounds copolymerizable with styrene and acrylonitrile.

The crosslinking agent, emulsifier, initiators and chain transfer agents discussed in the previous step can also be used in this step in the same amounts to form the crosslinked styrene-acrylonitrile on crosslinked acrylate elastomer.

If desired, the two steps described above may be reversed in sequence.

After the emulsion polymerization of the crosslinked styrene-acrylonitrile polymer onto the crosslinked acrylic elastomer or the reverse sequence of these two steps has been accomplished, the final step of the present invention is performed. This is the formation of a linear styrene-acrylonitrile polymer which is not substantially grafted onto the crosslinked acrylic elastomer-crosslinked styrene-acrylonitrile copolymers. The amount of linear styrene-acrylonitrile polymer which is grafted is less than 30 weight percent, preferably less than 20 weight percent. This third step may be accomplished by either suspension or emulsion polymerization of charge styrene and acrylonitrile monomers having the same general composition as the styrene and acrylonitrile charge used in the previous step in the absence of a crosslinking monomer. The combined amounts of styrene and acrylonitrile utilized in this step will vary from 15-85% by weight of the final product. The same emulsifiers, initiators, chain transfer agents and optional monomers utilized in previous steps may be used in this final polymerization procedure.

If suspension polymerization is chosen, the suspending agent can be methyl cellulose, hydroxyethyl cellulose, hydroxypropyl cellulose, carboxymethyl cellulose, talc, clay, polyvinyl alcohol, gelatine and the like. Preferred for this purpose is hydroxypropyl methyl cellulose which should, preferably, have a viscosity of at least about 3,000 and preferably, about 15,000 cps. as determined, at 20 degree C., with a 2%, by weight, aqueous solution of the polymer in a Ubbelohde viscometer according to ASTM Procedures D-1347 and D-2363-65T.

Other additives can be used in forming the linear styrene-acrylonitrile matrix to confer desired properties upon the final product. Included are conventional light, thermal and ultraviolet light stabilizers, antioxidants, dyes, pigments, mineral additives and fillers and reinforcing agents.

In yet another aspect of the invention, certain compositions comprise pellets having substantially uniform blends of terpolymer ASA and a wood component. The amount of terpolymer ASA in a blend with wood typically can range from less than about 1% to more than about 99%, by weight.

Various types of terpolymer ASA's are available from several commercial sources. Such terpolymer ASA's are polymeric materials including units derived from styrene, and/or a derivative thereof, acrylonitrile and acrylate and/or methacrylate monomers.

Suitable terpolymer ASA's are disclosed in Morinaga et al U.S. Pat. No. 4,151,226, as described elsewhere herein.

A very useful ASA terpolymer material includes about 58.4% by weight of styrenic units, about 23.3% by weight acrylonitrile units, and about 18.3% by weight acrylate units.

The wood preferably is present in the present weatherable materials in an amount in a range of about 0.5% to about 60% or about 70% by weight, more preferably about 1% to about 40% by weight, based on the total weight of the material. Although the wood component may be present in any suitable form, it is preferred that the wood be present as wood particles, such as wood chips, wood flakes, sawdust, wood flour, and the like, and mixtures thereof. More preferably, such particles have a size in the range of about 40 to about 200 U.S. mesh, still more preferably, about 50 to about 150 U.S. mesh.

Very useful results are obtained with the wood component being selected from pine wood, woods softer then pine wood, such as fir wood and the like and mixtures thereof. The wood component may also include a wood which is harder than pine wood, such as oak wood, walnut wood, hickory wood, maple wood and the like and mixtures thereof. One very useful combination is a wood component which includes a first wood at least as soft as pine wood and a second wood harder than pine wood. In this embodiment, the first wood preferably is present in a major amount, that is at least 50% of the total wood present, while the relatively hard wood is present in a minor amount, that is less than 50% of the total wood present. The wood component may, and preferably does, act to reinforce the present compositions or materials.

Optionally, some of the compositions of this invention may further contain effective amounts of one or more additional agents, such as vinyl chloride polymer, glassy amorphous polymer, impact resistance modifiers, for example, acrylic copolymers, such as elastomers of crosslinked alkyl acrylate/graft (meth)acrylate, ethylene-containing polymeric components, such as ethylene/propylene copolymer, ethylene/(meth)acrylate copolymers and the like, as described above. Compositions of this invention may also include effective amounts of conventional pigments, processing aides, lubricants, antioxidants and stabilizers such as ultraviolet light and thermal stabilizers, and the like.

In one particularly useful embodiment, the present compositions include pellets comprising a vinyl chloride polymer and/or a glassy amorphous polymer, and being substantially free of wood. Based on the composition weight, the compositions may include ASA polymeric material from about 25% or about 30% to about 90% or more; wood component in a amount effective to provide the desired wood-like look and texture; the vinyl chloride polymer in an amount in a range of about 0% to about 50%; and/or the glassy amorphous polymer of about 0% to 40%.

The terminology "vinyl chloride polymer," as used herein, is meant to encompass polyvinyl chloride homopolymers, as well as the copolymers of vinyl chloride with comonomers polymerizable therewith, with the former monomer predominating the latter in amount. Such comonomers include vinyl esters of carboxylic acids, such as vinyl acetate, the $C_1$-$C_{20}$ alkyl esters of acrylic and methacrylic acid, the aryl, halo- and nitro-substituted benzyl esters of acrylic and meth acrylic acid, the ethylenically unsaturated mono- and dicarboxylic acids, and the like.

The term "glassy amorphous polymer" as used herein, is intended to encompass those resins which are non-rubber modified, non-crystalline, and have good mechanical, thermal, and hardness properties. Details regarding the structure of these polymeric materials as well as the processes for forming them are available from a number of sources. Representative polymers which are included in this class of plastics include: acrylic resins such as polymethyl methacrylate, polyethyl acrylate, polybutyl acrylate, polystyrene, and poly-alpha-methyl styrene. Copolymers of glassy amorphous polymerizable monomers are also intended to be encompassed, e.g., copolymers of styrene with methylmethacrylate or acrylonitrile. Commercially available acrylic resins include those sold under the following trademarks: Lucite (E.I. duPont de Nemours and Co.); and Plexiglas (Rohm and Haas Co.). Commercially available styrene-acrylonitrile polymers are available under the following marks: Tyril (Dow Chemical) and Lustran (Monsanto).

In another particularly useful embodiment, the present compositions include pellets having an increased amount of lubricant relative to the amount of lubricant included in a similar composition without the filler, e.g., wood. Such increased amount of lubricant is effective in facilitating forming a substantially uniform physical blend of the components of the present compositions, particularly, since the wood being employed is often relatively dry and/or relatively incompatible with the copolymer components of the compositions. Without wishing to limit the invention to any particular theory of operation, it is believed that the lubricant acts to wet the surface of the wood and/or to facilitate the physical mixing of the components of the present compositions. The amount of lubricant used preferably increases as the amount of wood increases. The amount of lubricant used may vary widely depending on the specific lubricant employed. The amount of lubricant employed may be in a range of about 0.1% or about 0.5% to about 2% or about 5%, by weight of the total composition.

The present compositions may be used in the methods of the invention. For example, processes or methods for forming weatherable materials are provided. As discussed herein, in one embodiment, a process for manufacturing a weatherable material comprises a step of combining a first population of pellets comprising an ASA polymeric material and a wood component, and a second population of different pellets comprising a vinyl chloride polymer.

In certain embodiments, the relative amounts of the first population of pellets and the second population of pellets are selected to provide a combination of pellets having at least one desired property. For example, the resulting weatherable materials may have an increased vinyl chloride amount without a significant increase in the amount of wood.

The present methods may comprise a step of extruding the combination of pellets into an extruded composition. For example, the combination of the first population and the second population of pellets may be processed by an extruder device to form a weatherable material.

The ASA polymeric material of the first population of pellets may include an interpolymer, as discussed herein. In addition, the wood component of the first population of pellets may be present as wood particles, for example, wood particles having a size in a range of about 40 to about 200 U.S. mesh, as described above. The wood present in the first population of pellets may be any suitable type of wood, and in preferred embodiments, the wood is selected from the group consisting of pine wood, woods softer than pine wood, and mixtures thereof. In certain embodiments, the wood is a wood other than a hardwood. However, in other embodiments, the wood component may comprise more than one type of wood. For example, the wood component may include a first wood that is at least as soft as pine wood, and a second wood that is harder than pine wood. As discussed herein the wood component may be present in the pellets in a variety of forms. For example, the wood component may comprise particles of wood. In certain embodiments, the wood component comprises wood chips, wood flakes, sawdust, wood flour, or mixtures thereof.

As discussed herein, the second population of pellets used in the present methods may be substantially free of wood.

The combining step of the present methods or processes may include combining an amount of the second population of pellets, such as the pellets comprising a vinyl chloride polymer, in an amount effective to enhance the flame retardancy of the weatherable material relative to a substantially identical material without the vinyl chloride polymer. Advantageously, the amount of the vinyl chloride polymer present in the weatherable materials can be selectively increased without increasing the amount of wood in the materials, as compared to existing weatherable materials which use pellets of a vinyl chloride polymer and wood particles.

The present methods may also comprise a step of adding an acrylic copolymer, such as the acrylic copolymers discussed herein, to the combination of pellets in an amount effective to enhance the impact resistance of the weather material relative to a substantially identical material without the acrylic copolymer.

In addition, or alternatively, the present methods may include a step of adding an effective amount of a lubricant to the extrudable composition.

Such methods comprise providing an acrylonitrile/styrene/acrylate polymeric material; providing a wood component; and forming a substantially uniform physical blend of the acrylonitrile/styrene/acrylic polymeric material and the wood component.

The present forming step preferably includes subjecting the mixture of the acrylonitrile/styrene/acrylic polymeric material and the wood component to conditions effective to produce a substantially uniform, flowable or extrudable composition. Other additives may also be added. Such conditions can include, for example, elevated temperature conditions, elevated pressure conditions, shear or mixing conditions and combinations thereof. The forming step more preferably further includes extruding the substantially uniform composition, in particular, extruding the substantially uniform, flowable or extrudable composition, into useful shapes and configurations.

One particular method of the present invention for forming a weatherable materials comprises providing an uncross-linked acrylonitrile/styrene copolymer; providing a cross-linked alkyl acrylate/graft (meth)acrylate copolymer; providing filler component particles and forming a substantially uniform physical blend of these two copolymers and the filler particles. This physical blend preferably is substantially free of cross-linked acrylonitrile/styrene copolymer.

The present forming step preferably includes subjecting a mixture of uncross-linked acrylonitrile/styrene copolymer, alkyl acrylate/graft (meth)acrylate copolymer and filler component particles to conditions effective to produce a substantially uniform, flowable or extrudable composition. In one embodiment, the forming step includes extruding the substantially uniform physical composition, in particular, the substantially uniform flowable or extrudable composition.

Blending of the formulation of the present invention can be achieved by any of the well-known polymer blending techniques, such as two-roll or Banbury mixing, single or multiple screw extrusion, or any other method which applies sufficient heat (temperature) and/or pressure and/or shear (mixing) to the ingredients to obtain an uniform blend. Typical temperatures are in a range of about 300° F. or about 325° F. to about 450° F. or about 475° F., while typical elevated pressures are in a range of about 750 psi or about 1000 psi to about 2000 psi or more. At such temperatures and/or pressures, the shear or mixing force typically generated in the above-noted mixing or extrusion systems is sufficient to obtain the desired, substantially uniform blend.

The substantially uniform blend formed preferably includes at least about 30% by weight, based on the total weight of the copolymers present, of the uncross-linked acrylonitrile/styrene copolymer and at least about 5% by weight, based on the total weight of the copolymers present, of the cross-linked alkyl acrylate/graft (meth)acrylate copolymer and an amount of filler component particles effective as a filler in the final composition. More preferably, the uncross-linked acrylonitrile/styrene copolymer is present in an amount in a range of about 30% to about 95% by weight based on the total weight of the copolymer and the cross-linked alkyl acrylate/graft (meth)acrylate copolymer is present in an amount in a range of about 5% to about 70% by weight based on the total weight of the copolymers. It is preferred that, during the forming step, substantially no polymerization occurs.

The following non-limiting examples illustrate certain features of the present invention.

EXAMPLE 1

A formulation can be prepared by combining the following ingredients: uncross-linked, linear acrylonitrile/styrene copolymers (69.5% by weight; sold by Bayer under the trademark Lustran 31 (contains about 23% by weight of acrylonitrile)); cross-linked n-butyl acrylate/graft methyl (meth)acrylate copolymer (20.4% by weight wood particles (8.0% by weight; 100 U.S. Mesh pine wood flour); lubricant (1.5% by weight; sold by Struktol Corporation under the trademark TR-251, metal stearate/amide composition effective as lubricant); stabilizer (0.15% by weight); light stabilizer (0.30% by weight; well known, commercially available component); and antioxidant (0.15% by weight; well known, commercially available component).

The formulation is thoroughly mixed at elevated temperatures of about 400° F.-450° F. (which is the melt temperature range of these formulations) to form a substantially uniform, extrudable composition.

EXAMPLE 2

A formulation can be prepared by combining the following ingredients: vinyl chloride polymer (60% by weight; Geon 103 EPR-76 brand); glassy amorphous polymer (35% by weight; Lucite 147K brand (E.I. duPont de Nemours and Co.); acrylic copolymer (3.1% by weight; sold by Rohm & Haas Co. under the trademark Acryloid KM334, n-butyl acrylate/butylene glycol diacrylate/methyl methacrylate/alkylacrylate); lubricant (1.3% by weight; sold by Struktol Corporation under the trademark TR-251, metal stearate/amide composition effective as lubricant); stabilizer (0.2% by weight); light stabilizer (0.27% by weight; well known, commercially available component); and antioxidant (0.13% by weight; well known, commercially available component).

The formulation is thoroughly mixed at elevated temperatures of about 400° F.-450° F. (which is the melt temperature range of these formulations) to form a substantially uniform, extrudable composition.

EXAMPLE 3

A formulation can be prepared by forming a vinyl chloride polymer (100% by weight) into a composition that is melted at an elevated temperature to form a substantially uniform, extrudable composition.

EXAMPLE 4

The extrudable compositions of Examples 1-3 are each successfully formed into pellets using a Cincinnati Milacron Model CM-80 conical twin screw extruder and a Beringer Water Ring Pelletizer. In each, the following conditions are employed.

| | |
|---|---|
| Barrel Zone 1 | 325° F. |
| Barrel Zone 2 | 325° F. |
| Barrel Zone 3 | 365° F. |
| Barrel Zone 4 | 365° F. |
| Adaptor Zone 1 | 365° F. |
| Adaptor Zone 2 | 365° F. |
| Screenchanger Zone 3 | 365° F. |
| Die Zone 4 | 375° F. |
| Die Zone 5 | 375° F. |
| Screw Oil | 350° F. |
| Motor, RPM | 2000 |
| Motor Load, amps | 110 |

The pellets so formed are then stored in a container for later use. The pellets of Example 1 are pellets comprising an ASA polymeric material and a wood component. The pellets of Examples 2 and 3 are each pellets comprising a vinyl chloride polymer with substantially no wood.

EXAMPLE 5

A composition of pellets can be produced by combining the pellets of Example 1 with the pellets of either Example 2 or Example 3 so that 50% by weight of the composition are the pellets of Example 1, and 50% by weight of the composition are the pellets of either Example 2 or Example 3. The composition is successfully extruded using a 2.5 inch, 24:1 L/D Akron extruder. The following conditions are used:

| | |
|---|---|
| Barrel Zone 1 | 310° F. |
| Barrel Zone 2 | 330° F. |
| Barrel Zone 3 | 350° F. |
| Die Zone 1 | 360° F. |
| Die Zone 2 | 360° F. |
| Capping Head | 360° F. |
| Screw, RPM | 24 |
| Motor Load, amps | 18 |

EXAMPLE 6

A composition of pellets can be produced as described in Example 5, except 70% by weight of the composition is pellets of Example 1 and 30% by weight of the composition is pellets of either Example 2 or Example 3. The composition is successfully extruded using the extruder and similar conditions as described in Example 5.

EXAMPLE 7

A composition of pellets can be produced as described in Example 5, except 30% by weight of the composition is pellets of Example 1 and 70% by weight of the composition is pellets of either Example 2 or Example 3. The composition is successfully extruded using the extruder and similar conditions as described in Example 5.

The combined pellet mixtures in the Examples are found to have sufficient weatherability to be used out-of-doors on a long term basis.

All patents, patent applications, patent publications, and other references identified herein are hereby incorporated by reference in their entireties.

While this invention has been described with respect to various specific examples and embodiments, it is to be understood that the invention is not limited thereto and that it can be variously practiced within the scope of the following claims.

What is claimed is:

1. A process for producing an extrudable composition useful in forming a shaped product comprising:
    providing a first population of pellets comprising a first composition comprising an acrylonitrile/styrene/acrylic polymeric material and a wood component;
    providing a second population of pellets having a different composition than the first population of pellets and comprising a second composition comprising a vinyl chloride polymeric material; and
    combining a portion of the first population of pellets and a portion of the second population of pellets to form a combination of pellets that is extrudable into a shaped product other than pellets.

2. The process of claim 1, wherein the relative amounts of the first population of pellets and the second population of pellets in the combination are selected to provide the combination with at least one desired property.

3. The process of claim 1, further comprising extruding the combination of pellets to form the shaped product other than pellets.

4. The process of claim 1, wherein the acrylonitrile/styrene/acrylic polymeric material includes a physical mixture of an acrylonitrile/styrene polymer component and an acrylic polymer component.

5. The process of claim 1, wherein the first population of pellets is formed by a process comprising extruding and pelletizing the first composition.

6. The process of claim 1, wherein the wood component is present in an amount effective in reinforcing the shaped product other than pellets.

7. The process of claim 1, wherein the wood component is selected from the group consisting of pine wood, woods softer than pine wood, and mixtures thereof.

8. The process of claim 1, wherein the wood component includes a first wood at least as soft as pine wood and a second wood harder than pine wood.

9. The process of claim 1, wherein the wood component is present in a form selected from the group consisting of wood chips, wood flakes, sawdust, wood flour and mixtures thereof.

10. The process of claim 1, wherein second population of pellets is substantially free of wood.

11. The process of claim 1, wherein the second population of pellets is present in the combination of pellets in an amount effective to enhance the flame retardancy of the shaped product other than pellets relative to a substantially identical shaped product other than pellets produced without the second population of pellets.

12. The process of claim 4, wherein the acrylic polymer component is an acrylic copolymer in an amount effective to enhance the impact resistance of the shaped product other than pellets relative to a substantially identical product without the acrylic copolymer.

13. The process of claim 12, wherein the acrylic copolymer comprises a crossed-linked alkyl acrylate/graft (meth) acrylate copolymer.

14. The process of claim 13, wherein the cross-linked alkyl acrylate/graft (meth)acrylate copolymer includes cross-linked n-butyl acrylate-containing copolymer and methyl methacrylate-containing polymer.

15. The process of claim 1, further comprising adding an effective amount of a lubricant to the composition.

16. A composition, comprising
a first population of pellets comprising a first composition comprising an acrylonitrile/styrene/acrylic polymeric material and a wood component, the first population of pellets formed by a process comprising extruding and pelletizing the first composition; and
a second population of pellets comprising a vinyl chloride polymeric material, having a different composition than the first population of pellets and being substantially free of wood, the second population of pellets being combined with the first population of pellets to form a combination of pellets that is extrudable into a shaped product other than pellets.

17. The composition of claim 16 in a container.

18. The composition of claim 16, wherein the acrylonitrile/styrene/acrylic polymeric material includes an interpolymer.

19. The composition of claim 16, wherein the acrylonitrile/styrene/acrylic polymeric material includes a physical mixture of an acrylonitrile/styrene polymer component and an acrylic polymer component.

20. The composition of claim 16, wherein the acrylonitrile/styrene/acrylic polymeric material includes a terpolymer.

21. The process of claim 1 which further comprises combining another portion of the first population of pellets and another portion of the second population of pellets to form another combination of pellets that is extrudable into another shaped product other than pellets, said another combination of pellets having different relative amounts of the first population of pellets and the second population of pellets than said combination.

* * * * *